United States Patent
Geens et al.

(10) Patent No.: US 12,032,218 B2
(45) Date of Patent: Jul. 9, 2024

(54) CABLE SEALING MODULE

(71) Applicant: COMMSCOPE TECHNOLOGIES LLC, Hickory, NC (US)

(72) Inventors: Johan Geens, Bunsbeek (BE); Sandra Goossens, Tienen (BE); Kristof Vastmans, Boutersem (BE)

(73) Assignee: CommScope Technologies LLC, Hickory, NC (US)

( * ) Notice: Subject to any disclaimer, the term of this patent is extended or adjusted under 35 U.S.C. 154(b) by 332 days.

(21) Appl. No.: 17/288,831

(22) PCT Filed: Oct. 25, 2019

(86) PCT No.: PCT/US2019/058026
§ 371 (c)(1),
(2) Date: Apr. 26, 2021

(87) PCT Pub. No.: WO2020/086942
PCT Pub. Date: Apr. 30, 2020

(65) Prior Publication Data
US 2021/0356690 A1    Nov. 18, 2021

Related U.S. Application Data

(60) Provisional application No. 62/751,269, filed on Oct. 26, 2018.

(51) Int. Cl.
G02B 6/44    (2006.01)
(52) U.S. Cl.
CPC ................. G02B 6/4472 (2013.01)
(58) Field of Classification Search
CPC .................................................. G02B 6/4472
USPC .......................................................... 385/134
See application file for complete search history.

(56) References Cited

U.S. PATENT DOCUMENTS

| | | | |
|---|---|---|---|
| 4,653,848 A * | 3/1987 | Kloots | G02B 6/381 385/100 |
| 6,046,406 A | 4/2000 | Milanowski et al. | |
| 6,561,848 B1 | 5/2003 | Khemakhem et al. | |
| 6,573,455 B1 * | 6/2003 | Radelet | H02G 15/013 174/92 |

(Continued)

FOREIGN PATENT DOCUMENTS

| EP | 0 442 941 B1 | 1/1995 |
|---|---|---|
| EP | 0 587 616 B1 | 7/1996 |

(Continued)

OTHER PUBLICATIONS

International Search Report and Written Opinion of the International Searching Authority for International Patent Application No. PCT/US2019/058026 dated Feb. 14, 2020, 12 pages.

(Continued)

*Primary Examiner* — Kaveh C Kianni
(74) *Attorney, Agent, or Firm* — Merchant & Gould P.C.

(57) ABSTRACT

A sealed structure (e.g., sealing module, sealing projection, etc.) transitions the direction of one or more cables passing through the structure. Sealant (e.g., a gel block) is disposed within the structure to seal one or more cables extending along a transition path within the sealed structure. Ducts and/or cables may be anchored to the sealed structure. The sealed structure may be mechanically secured to a closure at a selected rotational orientation.

23 Claims, 8 Drawing Sheets

(56) References Cited

U.S. PATENT DOCUMENTS

| | | | | |
|---|---|---|---|---|
| 7,070,440 B1* | 7/2006 | Zerebilov | ............ | H01R 24/40 |
| | | | | 439/582 |
| 8,791,374 B1 | 7/2014 | Smith | | |
| 8,989,550 B2* | 3/2015 | Allen | ............ | G02B 6/4454 |
| | | | | 385/135 |
| 2009/0186522 A1* | 7/2009 | Henningsen | ......... | H01R 24/545 |
| | | | | 439/582 |
| 2014/0314381 A1* | 10/2014 | Adams | ............ | C08L 83/04 |
| | | | | 524/505 |
| 2014/0370747 A1 | 12/2014 | Vaccaro et al. | | |
| 2018/0083401 A1 | 3/2018 | Paynter | | |
| 2018/0347305 A1* | 12/2018 | Angers, Jr. | ............ | E21B 33/068 |
| 2019/0317291 A1* | 10/2019 | Cams | ............ | H01R 12/75 |
| 2020/0124810 A1* | 4/2020 | Claessens | ............ | G02B 6/445 |

FOREIGN PATENT DOCUMENTS

| | | |
|---|---|---|
| KR | 10-2004-0075362 A | 2/2004 |
| WO | 2018/197410 A1 | 11/2018 |
| WO | 2020/081942 A1 | 4/2020 |

OTHER PUBLICATIONS

Extended European Search Report for European Patent Application No. 19876230.4 dated Jun. 14, 2022, 11 pages.

\* cited by examiner

CABLE SEALING MODULE

CROSS-REFERENCE TO RELATED APPLICATION

This application is a National Stage Application of PCT/US2019/058026, filed on Oct. 25, 2019, which claims the benefit of U.S. Patent Application Ser. No. 62/751,269, filed on Oct. 26, 2018, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers.

It is often preferred for the telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures.

Telecommunications enclosures are typically sealed to inhibit the intrusion of moisture or other contaminants. Pressurized gel-type seals have been used to effectively seal the locations where telecommunications cables enter and exit telecommunications enclosures. Example pressurized gel-type seals are disclosed by document EP 0442941 B1 and document EP 0587616 B1. Both of these documents disclose gel-type cable seals that are pressurized through the use of threaded actuators. Document U.S. Pat. No. 6,046,406 discloses a cable seal that is pressurized through the use of an actuator including a cam lever. While pressurized cable seals have generally proven to be effective, improvements in this area are still needed.

SUMMARY

Some aspects of the disclosure are directed to a structure that transitions the direction of one or more cables. In an example, the structure transitions the one or more cables about 90°. In other examples, the structure transitions the one or more cables between about 20° and about 160°, between about 45° and about 135°, between about 30° and about 160°, between about 60° and about 120°, or between about 70° and about 110°.

In certain implementations, the transition structure includes sealant to seal one or more cables within the structure. For example, the transition structure includes a gel block or other seal member (e.g., foam block, rubber gasket, etc.) that extends along a transition path along which the one or more cables extend within the transition structure.

In some examples, the transition structure may be attached to a closure (e.g., a cabinet, a pedestal, etc.) to facilitate routing the one or more cables into the closure. For example, the transition structure may be disposed at a cable port of the closure to aid in routing the one or more cables into an interior of the closure.

In other examples, the transition structure is routed through a sealing arrangement at an entrance or exit of a closure. A main body of the transition structure remains external to the sealing arrangement while a stem portion of the transition structure extends through the sealing arrangement.

In still other examples, the transition structure is unitarily formed with a closure.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
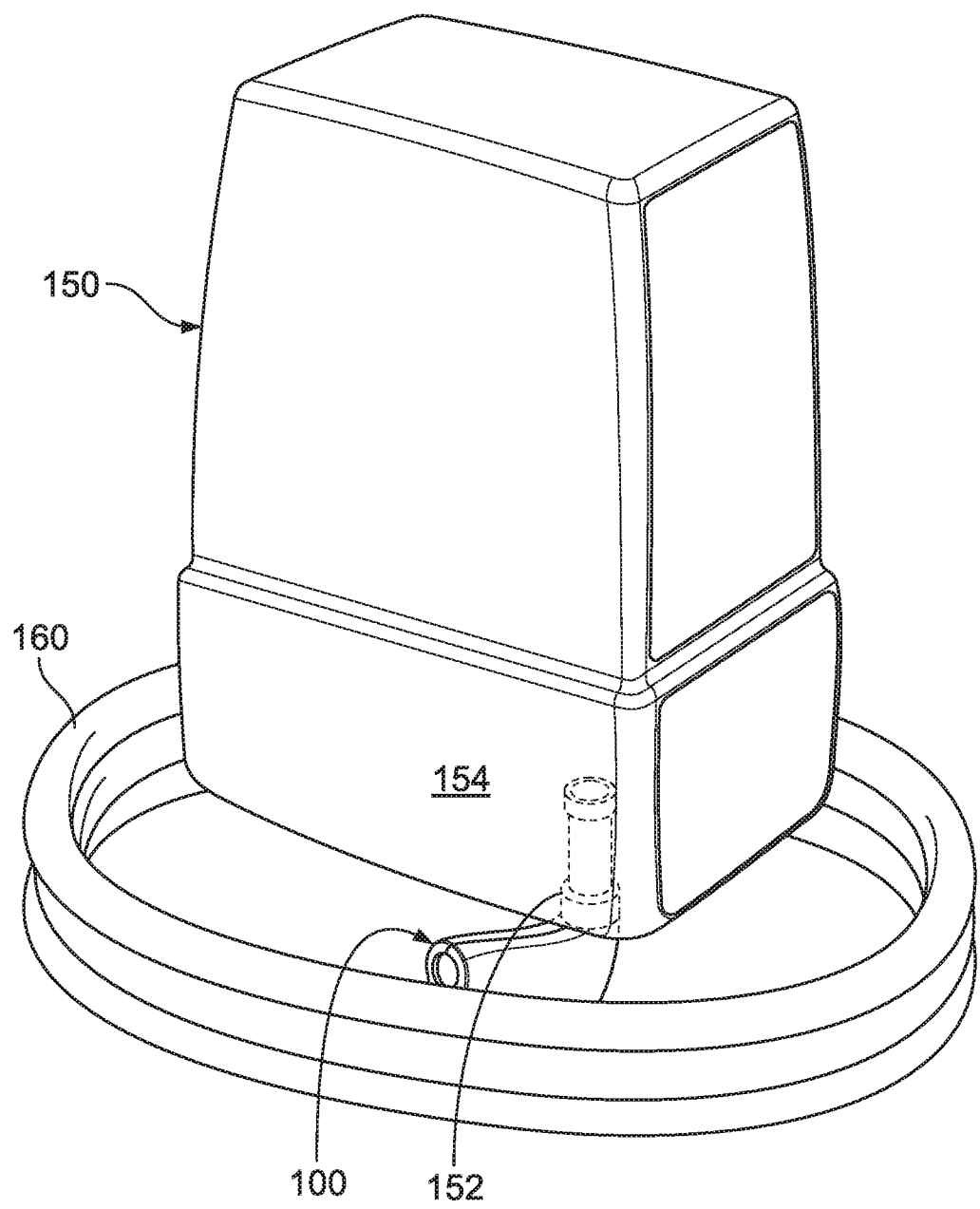
FIG. 1 is a perspective view of an example closure including a sealing module at or forming a sealed cable entrance to transition a direction of a cable routed into the closure.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a structure that transitions the direction of one or more cables. In an example, the structure transitions the one or more cables about 90°. In other examples, the structure transitions the one or more cables between about 20° and about 160°. In certain examples, the structure seals the one or more cables within the structure. For example, the structure includes a gel block or other seal member (e.g., foam block, rubber gasket, etc.) that extends along a transition path along which the one or more cables extend within the structure.

The transition structure may be attached to a closure (e.g., a cabinet, a pedestal, etc.) to facilitate routing the one or more cables into the closure. For example, the transition structure may be disposed at a cable port of the closure to aid in routing the one or more cables into an interior of the closure. In an example, the transition structure is disposed at a bottom of the closure to receive one or more cables routed generally parallel to the bottom of the closure and to transition the cables up through the bottom of the closure.

Referring now to the figures in general, a transition structure 100 includes a main enclosure body 101 defining a main interior 102. A projection 103 projects outwardly from the main enclosure body 101. The projection 103 includes a distal end 104 defining at least one port 105. The projection 103 and main interior 102 define a volume within which one or more cables 170 can extend along one or more interior routing paths R, R1, R2.

In some examples, one or more discrete routing paths are defined within the volume. In other examples, however, the one or more cables 170 can be freely routed within the volume. In such examples, the one or more cables 170 define the interior routing paths R, R1, R2. The volume is structured so that the one or more routing paths R, R1, R2 turn between the port 105 and the main interior 102.

In some examples, the one or more interior routing paths R, R1, R2 turns at an angle θ of at least 45 degrees as the interior routing paths extends from the port 105 to the main interior 102. In certain examples, the one or more routing paths R, R1, R2 turns at an angle θ of at least 60 degrees. In certain examples, the one or more routing paths R, R1, R2 turns at an angle θ of at least 75 degrees. In certain examples, the one or more routing paths R, R1, R2 turns at an angle θ of about 90 degrees (e.g., see FIG. 3).

In some implementations, the projection 103 has a base end 106 unitarily formed with the main enclosure body 101. In other implementations, the projection 103 is a separate part that mechanically attaches to the main enclosure body 101. In certain examples, the distal end 104 of the projection 103 defines a plurality of the ports. In certain examples, the projection 103 is one of multiple projections projecting from the main enclosure body 101.

In accordance with certain aspects of the disclosure, sealant 112 is contained within the interior volume along the one or more routing paths R, R1, R2. In some examples, the sealant 112 includes gel. In other examples, the sealant 112 includes foam, rubber, or other such materials. In some examples, the sealant 112 extends fully along the one or more routing paths R, R1, R2. In other examples, the sealant 112 extends along only a portion of the one or more routing paths. In some example, the sealant 112 extends into the projection 103. In other examples, the sealant 112 is disposed only in the main interior 102. In some examples, the sealant 112 fully fills the main interior 102. In other examples, the sealant 112 fills part of the main interior 102.

In such implementations, the transition structure 100 forms a sealing module 108 that seals about one or more cables 170 and/or one or more ducts 160 routed to a closure 150 (e.g., a cabinet, a pedestal, etc.). Optical fibers or optical fiber cables 170 can be pushed, pulled, or blown through the ducts 160. In an example, the closure 150 includes a fiber distribution hub (FDH). In another example, the closure 150 includes an optical termination enclosure (OTE). The closure 150 has a sealed entrance location 152 for receiving the cables 160 and/or ducts. The sealed entrance location 152 provides access to an interior 154 of the closure 150.

The ducts 160 can be initially installed prior to installing the fibers or cables 160. The ducts 160 are secured to the sealing module 108 during the initial installation. Subsequently, cables 170 (e.g., pushable cables) are routed through the ducts 160 to the closure 150. The cables 170 are routed through the sealing module 108 as will be described herein and into the closure interior 154.

The sealing module 108 includes the module housing 110 and sealant 112 within the module housing 110. The module housing 110 includes a first end portion 114 and a second end portion 116. The first end portion 114 defines at least one first port 118 and the second end portion 116 defines a second port 105 in communication with the at least one first port 118. The second end portion 116 is configured to be sealed within the sealed entrance location 152 of the closure 150 with the second port 105 in communication with the interior 154 of the closure 150.

In certain implementations, the module housing 110 defines a routing path R, R1, R2 that turns at least 45 degrees as the routing path R, R1, R2 extends from the at least one first port 118 to the second port 105. In certain implementations, the routing path R, R1, R2 turns at least 60 degrees. In certain examples, the routing path R, R1, R2 turns at least 75 degrees. In certain examples, the routing path R, R1, R2 turns about 90 degrees.

Figure 3:
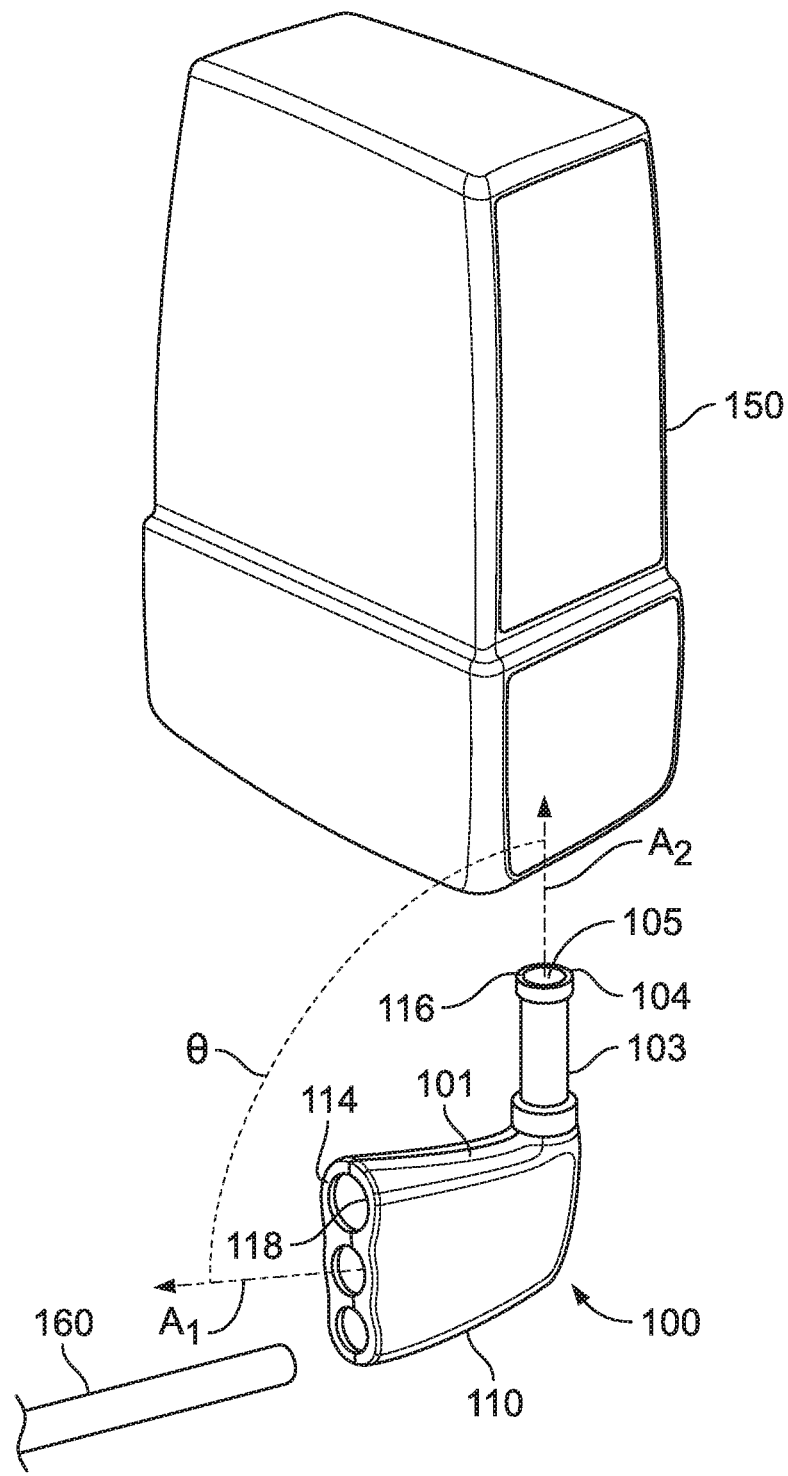
FIG. 3 shows an example sealing module exploded away from the closure and an example duct exploded away from the sealing module.
Figure 4:
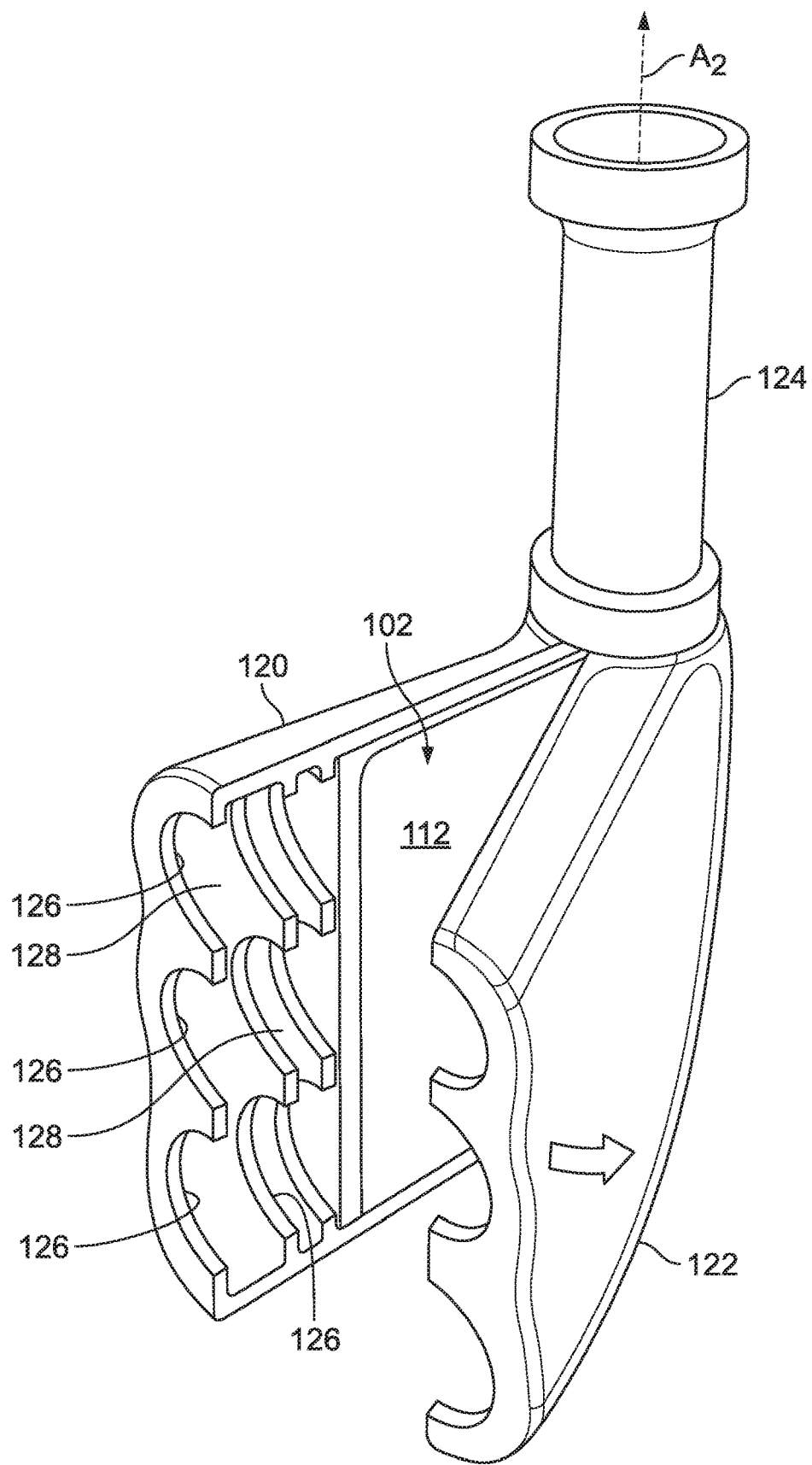
FIG. 4 shows the sealing module of FIG. 3 in an open position to provide access to the cables, sealant, and/or cable routing paths within the sealing module.
Figure 5:
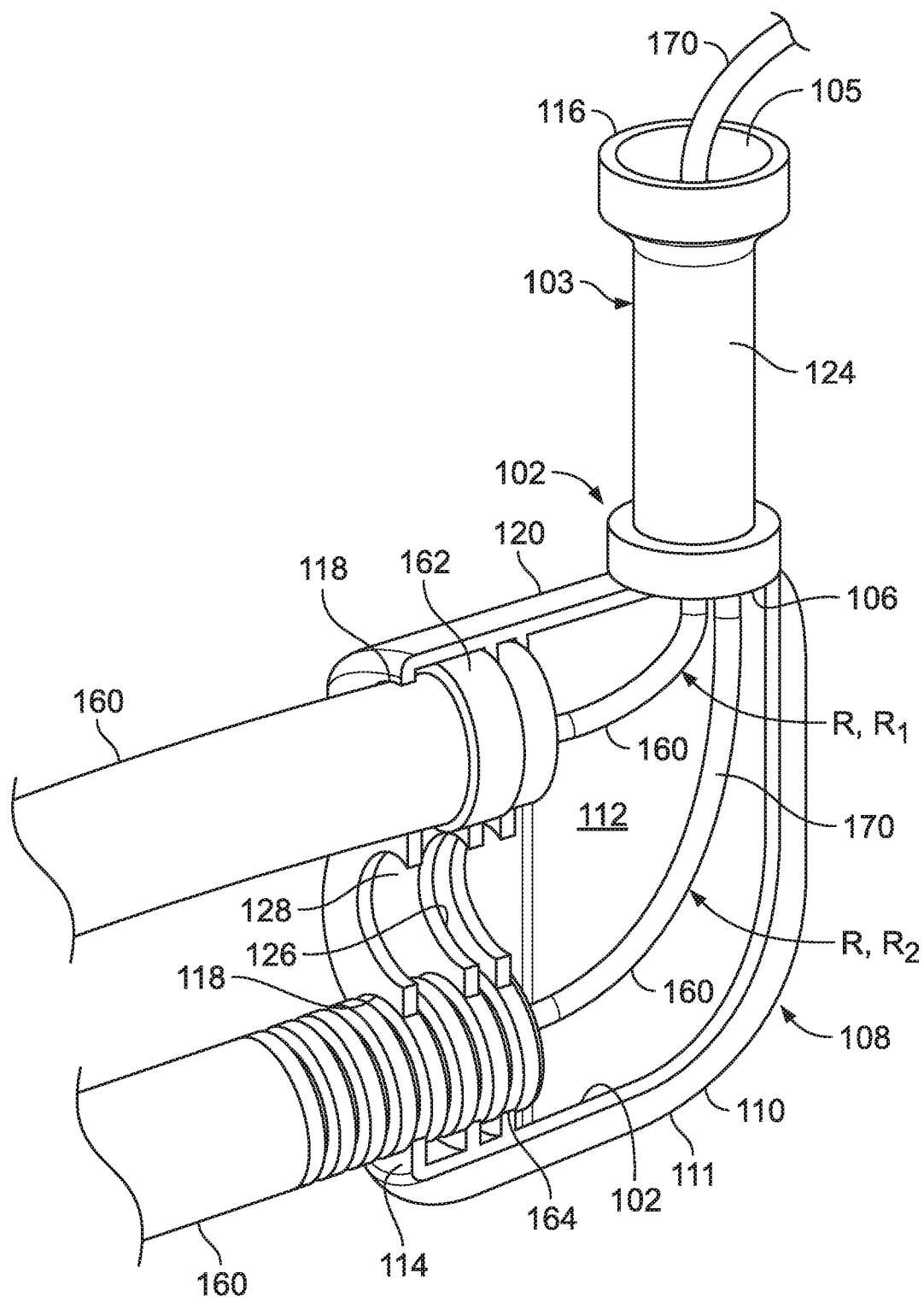
FIG. 5 shows the sealing module of FIG. 3 with a portion of a main housing body of the sealing module removed so that a main interior is visible.
Figure 6:
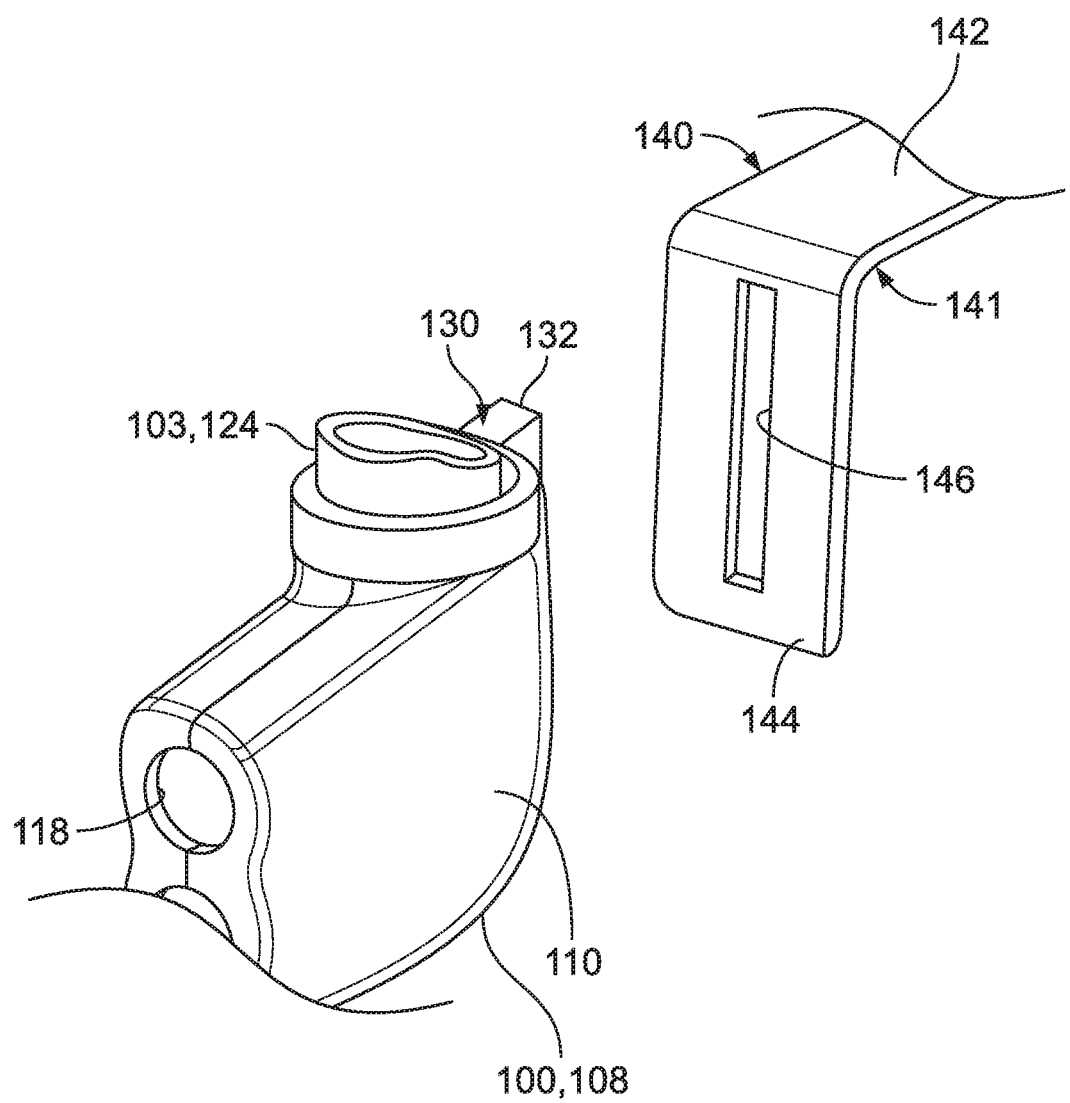
FIG. 6 illustrate a portion of the sealing module of FIG. 3 having a projecting rib aligned with an aperture of a bracket to secure the sealing module to a closure.

The first port 118 defines a first axis A1 and the second port 105 defines a second axis A2 (see FIG. 3). The first and second axes A1, A2 are angled relative to each other at an angle θ. In certain examples, the first and second axes A1, A2 are angled at an angle θ of at least 75 degrees relative to one another. In certain examples, the first and second axes A1, A2 are angled at an angle θ in the range of 75 to 135 degrees. In certain examples, the first and second axes A1, A2 are angled at an angle θ in the range of 75-120 degrees. In an example, the first and second axes A1, A2 are angled at an angle θ of about 90 degrees.

In certain implementations, the first end portion 114 defines a plurality of the first ports 118. In the example shown, the first end portion 114 defines three first ports 118. In other examples, however, the first end portion 114 can define a greater or lesser number of first ports 118 (e.g., one, two, four, six, eight, etc.).

In some implementations, the first end portion 114 is integral with the module housing 110 while the second end portion 116 is formed by the projection 103 extending from the module housing 110. In other examples, the first end portion 114 also can be formed by a separate projection extending from the module housing 110. In still other examples, both the first end portion 114 and the second end portion 116 can be integral with the module housing 110.

Figure 2:
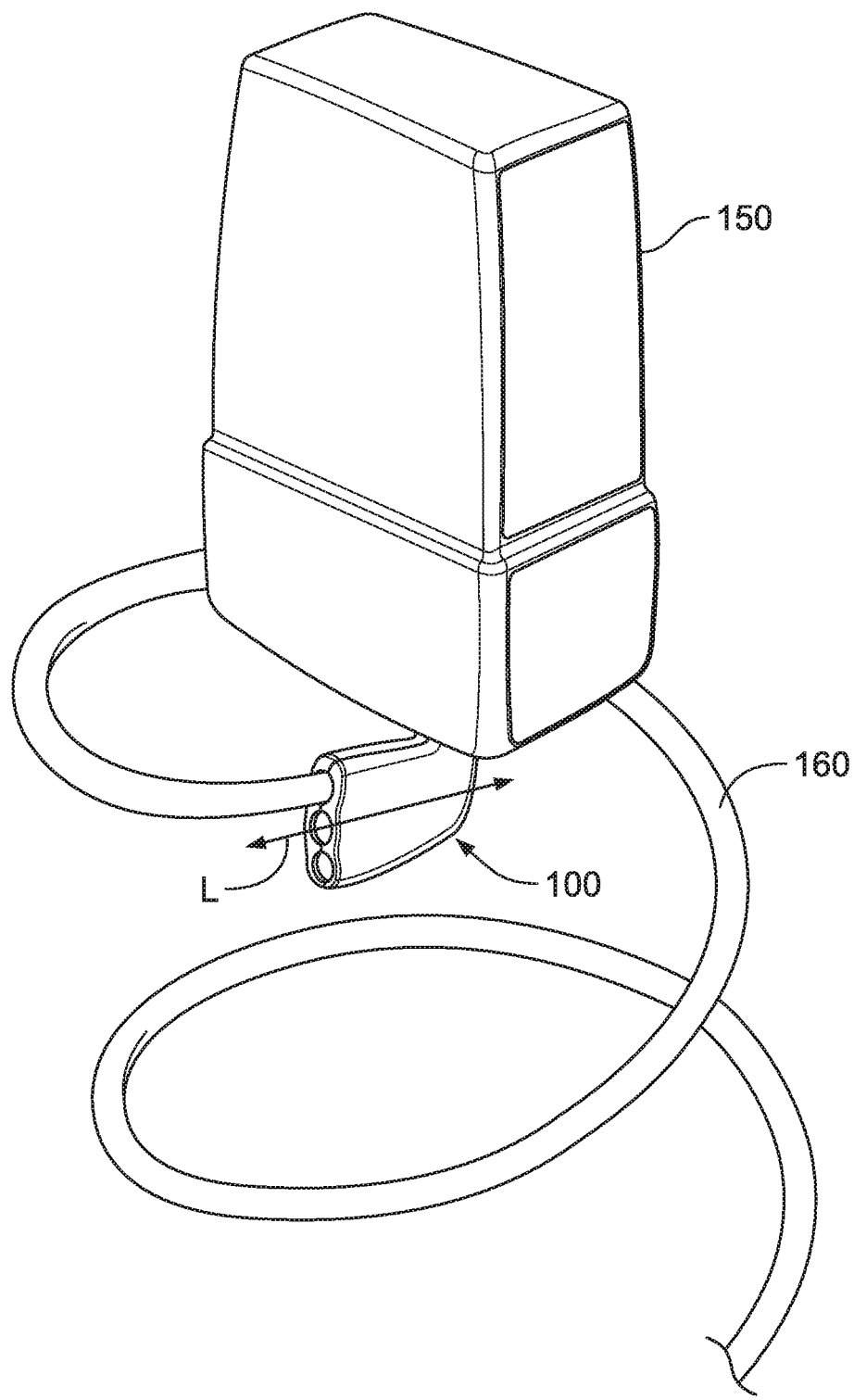
FIG. 2 shows the closure raised to facilitate access to the sealing module.

In certain implementations, the module housing 110 extends along a longitudinal axis L (FIG. 2) so that an insertion axis of the first port 118 is parallel with the longitudinal axis L. In certain examples, the insertion axes of each first port 118 are parallel with the longitudinal axis L. In certain examples, the longitudinal axis L defines the largest dimension of the module housing 110.

In certain implementations, the module housing 110 is re-enterable. For example, when the cables 170 are routed through the ducts 160 towards the closure 150, the module housing 110 may be opened to route the cables 170 through the sealing module 108. For example, an installer may pull the cables 170 into the module housing and route the cables 170 along a curved path from the first port 118 to the second port 105. When the module housing 110 is closed, the sealant 112 protects the cables 170 from the external environment. For example, a gel-type sealant 112 may be pressurized causing the gel to flow around the cables 170 to fill voids and to provide sealing about the cables 170. In certain examples, the gel also seals/flows partially into the end of the duct 160 to close the duct end. Accordingly, the end of the duct 160 may become embedded in the sealant 112.

In certain examples, the module housing 110 includes first and second shell pieces 120, 122 that mate together to enclose at least part of an interior 102 of the module housing 110. The shell pieces 120, 122 are separable to provide access into the interior 102 of the module housing 110. In an example, the first and second shell pieces 120, 122 are half-shell pieces. In an example, the first and second shell pieces 120, 122 are identically formed. In other examples, the first shell piece 120 is larger or smaller than the second shell piece 122.

In some implementations, the projection 103 is defined by the second shell piece 122 and the first shell piece 120 is configured to rotate about the projection 103 of the second shell piece 122. In such implementations, the first and second shell pieces 120, 122 cooperate to form the first end portion 114, the main interior 102, and the second end portion 116 of the sealing module 110. In other implementations, the main interior 102 and the first end portion 114 are defined by the first and second shell pieces 120, 122 of the module housing 110 while the second end portion 116 is defined by a separate stem 124 that mechanically couples to the shell pieces 120, 122. In such implementations, the first and second shell pieces 120, 122 cooperate to form a main housing body 111 that defines the main interior 102. The main housing body 111 also may define the one or more first ports 118.

In certain implementations, the stem 124 extends at an angle to the longitudinal axis L. In an example, the stem 124 extends generally transverse to the longitudinal axis L. In certain implementations, the stem 124 is generally cylindrical.

In certain implementations, the stem 124 has an interior volume that is less than the interior volume of the main housing body 111. In certain examples, the interior volume of the stem 124 is significantly less than the interior volume of the main housing body 111. For example, the interior volume of the stem 124 may be less than 50%, less than 45%, less than 40%, less than 35%, less than 30%, less than 25%, less than 20%, or less than 15% of the interior volume of the main housing body 111.

In accordance with certain aspects of the disclosure, the sealing module 108 is used with a system including a duct 160 for containing at least one optical fiber or at least one fiber optic cable 170. The duct 160 anchors to the first end portion 114 of the module housing 110. The at least one optical fiber or fiber optic cable 170 is adapted to be routed from the duct 160, through the sealing module 108, to the interior 102 of the enclosure 110.

In certain implementations, the first end portion 114 is configured for anchoring a duct 160 or cable 170 routed to the at least one first port 118. The first end portion 114 includes a first mechanical anchoring interface that interlocks with a second mechanical anchoring interface of the duct 160 to anchor the duct 160 relative to the first end portion 114 of the module housing 110.

In some examples, the second mechanical anchoring interface includes a flange 162. In other examples, the duct 160 is convoluted or has an exterior convoluted portion 164 that provides the second mechanical anchoring interface. In certain examples, the first end portion 114 includes a slot or slots 126 for receiving the flange 162 or the portion of a convolution 164 of a duct 160.

In the example shown, a series of ribs 128 are disposed within the module housing 110 recessed inwardly from the first end portion 114. Each of the ribs 128 defines one or more slots 126 that align with the cable ports 118 at the first end portion 114. The flange 162 or convoluted portion 164 of the duct 160 can be sandwiched or caught between the ribs 128 or between the ribs 128 and the module housing 110. In certain examples, the ribs 128 are disposed between the cable ports 118 and the sealant 112.

In certain examples, the module housing 110 opens to separate ribs 128 carried by the first shell housing piece 120 from ribs 128 carried by the second shell housing piece 122. The duct 160 can be inserted into the interior 102 of the module housing 110 and laterally slid into the slots 126 of the ribs 128 of one of the shell housing pieces 120, 122. The module housing 110 can be closed by moving the shell housing pieces 120, 122 together so that the respective ribs 128 of the shell housing pieces 120, 122 cooperate to define openings through which and end of the duct 160 extends. In certain examples, sealant, such as sealant 112, can be disposed between the ribs 128 and/or at the cable ports 118 to seal around the ducts 160.

In accordance with certain aspects of the disclosure, the module housing 110 includes a stabilization arrangement that inhibits relative movement between the sealing module 108 and the closure 150. For example, the stabilization arrangement may include a first stabilization mechanical interface 130 of the module housing 110 that engages a second stabilization mechanical interface 140 of the closure 150 to limit relative movement between the module housing 110 and the closure 150. In certain examples, the stabilization arrangement can allow for a limited range of pivotal movement (e.g., 0-20 degrees) about the axis of the second port 105 or stem 124 of the sealing module 108.

In certain implementations, one of the first and second stabilization mechanical interfaces 130, 140 includes a projection 132 and the other of the first and second stabilization mechanical interfaces 130, 140 includes a receptacle 146. In certain implementations, the first and second stabilization mechanical interfaces 130, 140 secure the sealing module 108 at a selected angular position relative to the closure 150 about an axis defined by the second port 105 or stem 124.

In certain examples, the second stabilization mechanical interface 140 is incorporated as part of a bracket 141 that attaches to the closure 150. For example, a bracket 141 may be attached to the closure 150 to define the receptacle 146. The module housing 110 may be oriented so that the projection 132 extends into the receptacle 146 defined by the bracket 141. Engagement between the projection 132 and the receptacle 146 inhibits lateral and/or rotational movement of the module housing 110.

In the example shown, the bracket 141 includes a mounting section 142 that is configured to be secured (e.g., fastened, welded, etc.) to the closure 150 (e.g., to a bottom surface of the closure 150). The bracket 141 also includes at least one stabilizing section 144 that extends outwardly (e.g., downwardly) from the mounting section 142. The stabilizing section 144 defines the receptacle (e.g., aperture) 146.

In the example shown, the first stabilization mechanical interface 130 includes a projecting rib 132 extending outwardly from the module housing 110. In certain examples, the projecting rib 132 extends outwardly at an opposite end of the module housing 110 from the first end portion 114. In certain examples, the projecting rib 132 is integral with the module housing 110 (e.g., with at least one of the shell pieces 120, 122). In the example shown, the projecting rib 132 includes a generally rectangular-shaped extension. In other examples, the projecting rib 132 can have any desired shape. In the example shown, the projecting rib 132 extends generally along the longitudinal axis L of the main housing body 111. In other examples, the projecting rib 132 may extend at an angle relative to the longitudinal axis L of the main housing body 111.

Preferably, the first and second stabilization mechanical interfaces 130, 140 allows the angular position to be selected from a plurality of angular positions. For example, the bracket could be mounted to the closure 150 at a plurality of different positions corresponding to different angular orientations of the sealing module 108 relative to the closure 150 about the stem or second port axis. In other examples, the bracket 141 could have a plurality of different interlock structures (e.g., slots 146) defining different angular mounting positions. In certain examples, the bracket 141 includes multiple stabilizing sections 144 that extend outwardly (e.g., downwardly) from the mounting section 142 in various orientations. Each stabilizing section 144 defines an aperture 146 for receiving the projecting rib 132. For example, one of the stabilizing sections 144 may be oriented at an angle (e.g., 45°, 90°, etc.) relative to another of the stabilizing sections 144.

In certain implementations, the sealing module 108 can have a plurality of different interlock structures (e.g., projecting ribs) 132 spaced about the axis of the second port 105 or stem 124 to define different angular mounting positons. For example, a first projecting rib 132 may be angled (e.g., at 20°, at 30°, at 45°, at 60°, at 75°, at 90°, etc.) relative to another projecting rib 132. In certain examples, multiple projecting ribs 132 may extend outwardly from the module housing 110 at regular angled intervals (e.g., every 10°, every 20°, every 30°, every 45°, every 90°, etc.) over an angular distance of between about 90° and about 180°. In an example, the sealing module 108 could have a gear-like structure with teeth/projections/ribs 132 positioned about the axis of the second port 105 or stem 124 so that the sealing module 108 can be locked at a certain rotational positon about the axis of the second port 105 or stem 124 relative to the closure 150 by engaging the tooth/projection/rib 132 corresponding to the desired angular position with the interlock structure 146 of the bracket 141.

Figure 7:
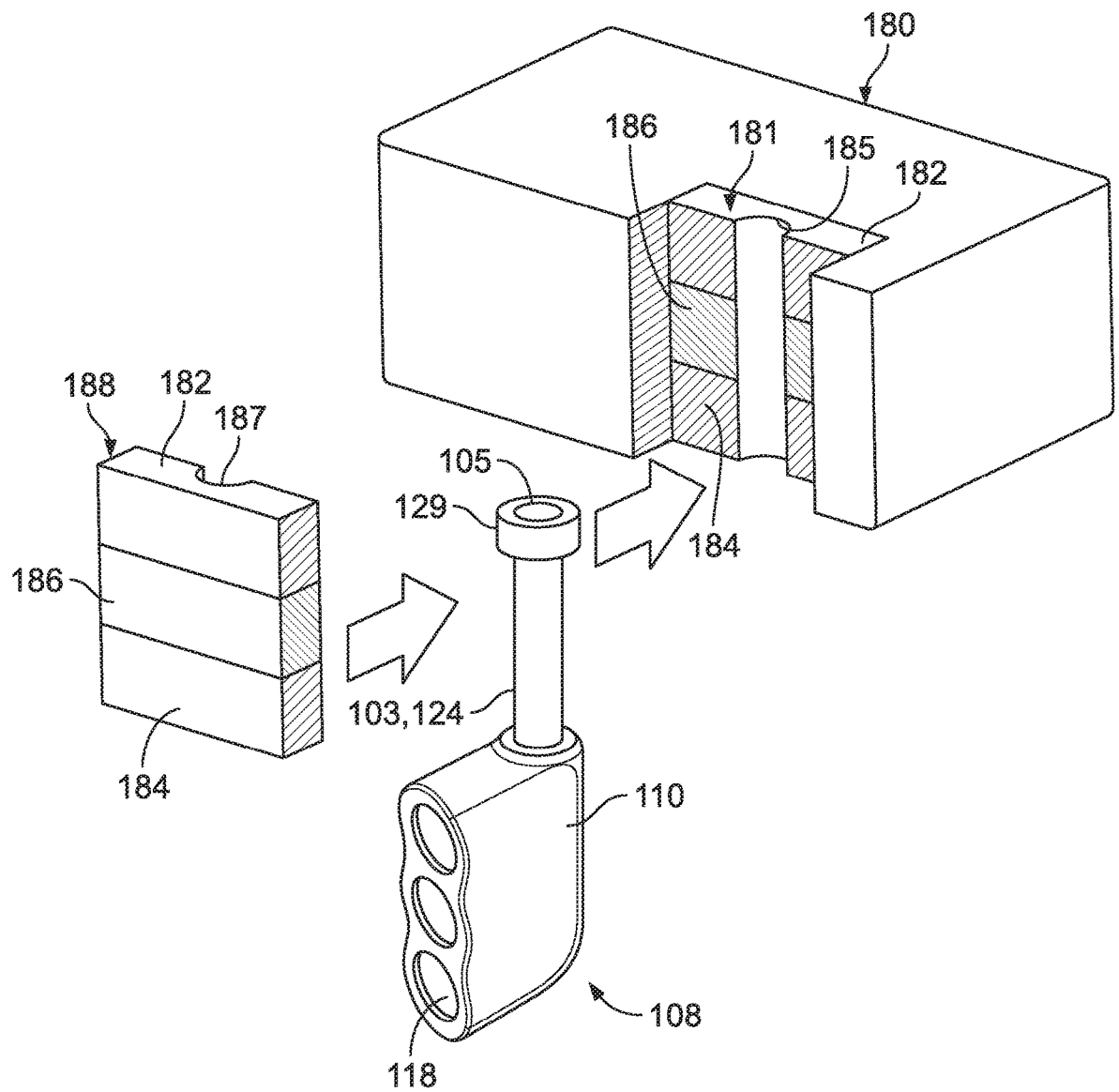
FIG. 7 shows the sealing module of FIG. 3 exploded out from a two-piece sealing arrangement to facilitate transitioning a direction of a cable routed through the sealing arrangement.

Referring to FIG. 7, the sealing module 108 can be utilized with a sealing arrangement 180 for a closure (e.g., closure 150). In the example shown, the sealing arrangement 180 can be positioned beneath the closure 150. A non-limiting example closure 150 suitable for use with a sealing arrangement 180 is shown and described in U.S. Pat. No. 9,948,082, the disclosure of which is hereby incorporated herein by reference.

The sealing arrangement 180 includes a first sealing portion 181 and a second sealing portion 188 that cooperate to define a cable passage through the sealing arrangement 180. Each of the sealing portions 181, 188 includes a gel block 186 disposed between two retention members 182, 184. Moving the retention members 182, 184 towards each other compresses and activates the gel block 186. Each sealing portion 181, 188 defines a groove or channel 185, 187 that cooperate to define the cable passage when the sealing portions 181, 188 are fit together (e.g., pressed together). Cables can be routed through the sealing arrangement 180 along the cable passages. For example, in FIG. 7, cables can be routed from a bottom of the sealing arrangement 180 to a top of the sealing arrangement 180.

In certain implementations, the sealing module 108 can be mounted to the sealing arrangement 180 to enable cables to be routed through the sealing arrangement 180 along a curved path. For example, the cables can be routed from a side of the sealing arrangement 180 to the top of the sealing arrangement 180. The sealing module 108 is positioned relative to the sealing arrangement 180 so that the second end portion 116 of the sealing module 108 is positioned between the first and second sealing portions 181, 188. In an example, the projection 103 or stem 124 of the sealing module 108 extends through one of the cable passages defined by the sealing portions 181, 188. The main housing body 111 is disposed external to (e.g., beneath) the sealing arrangement 180. In an example, a radial flange 129 of the stem 124 or projection 103 also is disposed external to (e.g., above) the sealing arrangement 180. Cables enter the sealing module 108 at the first port or ports 118, transition direction within the sealing module 108, and extend along the second portion 116 of the sealing module 108 through the cable passage 185, 187 to pass through the sealing arrangement 180.

Figure 8:
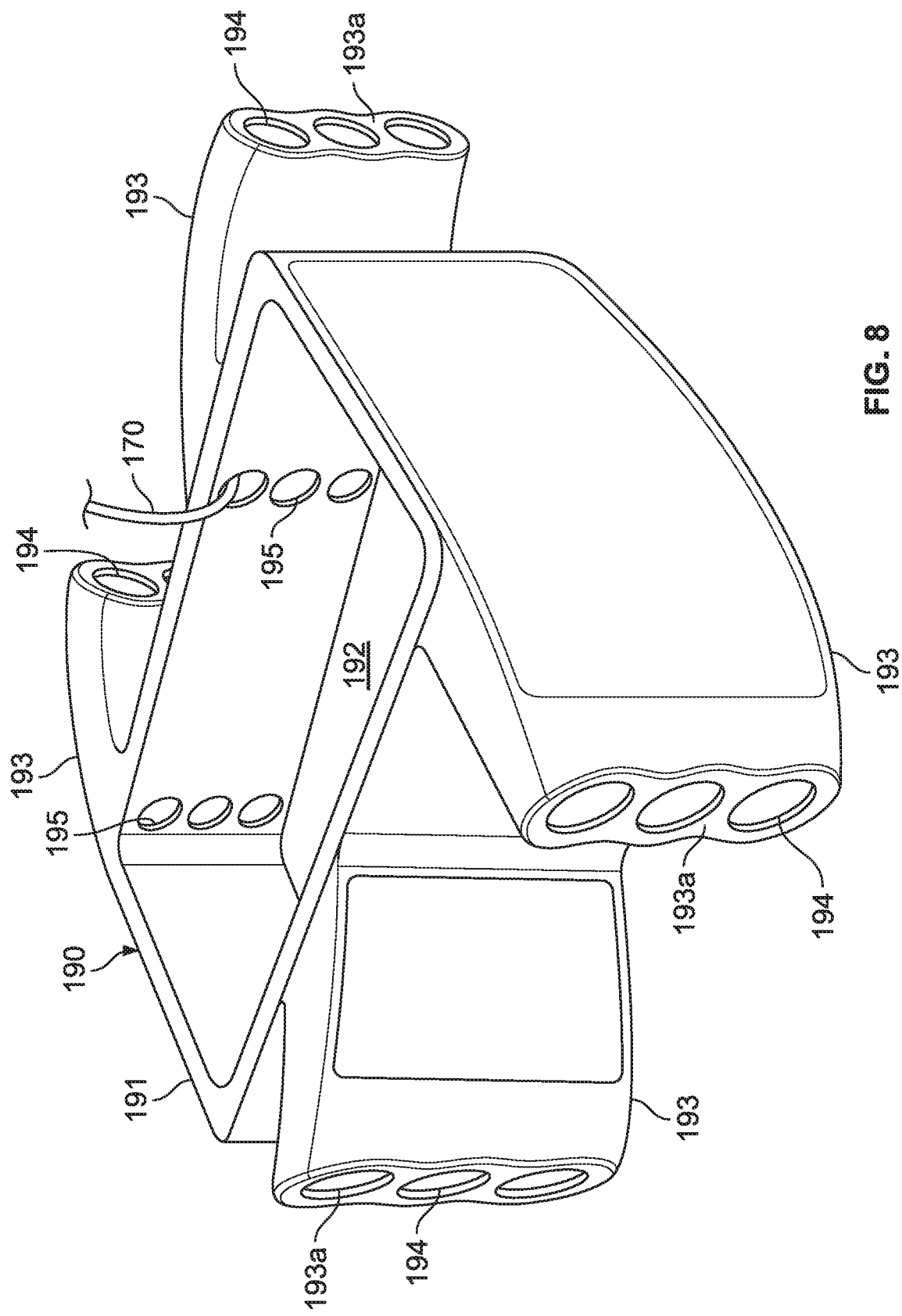
FIG. 8 is a perspective view of an example enclosure incorporating features of the sealing module of FIG. 3 as a unitary or partially integrated element.

Referring to FIG. 8, the features of the sealing module 108 can be incorporated into an enclosure (e.g., sealing arrangement body) 190 that forms part of or mounts to a closure, such as closure 150. In some examples, the enclosure 190 can be mounted to the closure 150 (e.g., at the bottom) at the sealed cable entrance 152. In other examples, the enclosure 190 forms part of the closure 150 and defines the sealed cable entrance 152.

The enclosure 190 includes a main enclosure body 191 defining a main interior 192. A projection 193 projects outwardly from the main enclosure body 191. The projection 193 includes a distal end 193a defining at least one externally accessible port 194. In certain examples, the distal end 193a of the projection 193 defines a plurality of the ports 194. In the example shown, each projection 193 defines three externally accessible cable ports 194. In other examples, each projection 193 can define a lesser or greater number (e.g., one, two, four, six, eight, etc.) of ports 194.

The projection 193 defines an interior routing path that extends from the port 194 to the main interior 191 (e.g., via an internally accessible port 195). The interior routing path transitions a direction of the cable between the externally accessible port 194 and the internally accessible port 195.

In certain examples, the routing path turns the cable at least 45 degrees as the interior routing path extends from the externally accessible port 194 to the main interior 192. In certain examples, the routing path turns at least 60 degrees. In certain examples, the routing path turns at least 75 degrees. In certain examples, the routing path turns about 90 degrees.

In certain implementations, sealant is contained within the routing path. In an example, the sealant includes gel. In certain implementations, sealant also may be contained within the main interior 192 of the main enclosure body 191.

For example, sealant (e.g., gel, epoxy, foam, etc.) may be added (e.g., placed, poured, etc.) to the main interior 192 after the cables are routed to the closure 150.

In certain implementations, the projection 193 is openable to facilitate routing the cables through the projections 193 along the cable routing paths. For example, the projection 193 may be formed from two or more shell pieces that cooperate to define the projection 193. In another example, the projection 193 has a first body portion unitary with the main enclosure body 191 and a second body portion that is removable from the first body portion. Removing the second body portion exposes a plane over which the cables can be routed through the projection 193. Portions of the sealant can be carried on each shell piece or body portion.

In certain examples, the projection 193 has a base end unitarily formed with the main enclosure body 191. In some examples, the second shell piece or body portion of the projection 193 at least partially defines the externally accessible ports 194. In other examples, the externally accessible ports are fully formed by the first shell piece or first body portion.

In certain implementations, the enclosure 190 includes multiple projections 193. In the example shown, the enclosure 190 includes four projections 193. In other examples, the enclosure 190 can include a lesser or greater number (e.g., one, two, three, five, six, eight, ten, twelve, sixteen etc.) of projections 193. In some examples, all of the projections 193 are disposed at a common wall of the enclosure 190. In other examples, the projections 193 are distributed over at least two walls. In certain examples, the projections 193 extend outwardly from four sides of the enclosure 190.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A sealing module for sealing about a cable and/or duct routed to an enclosure, the enclosure having a sealed entrance location for receiving cables and/or ducts, the sealing module comprising:
   a module housing including a first end portion and a second end portion, the first end portion defining at least one first port and the second end portion defining a second port in communication with the at least one first port, the at least one first port defining a first axis and the second port defining a second axis, the first and second axes being angled relative to each other, the second end portion being configured to be sealed within the sealed entrance location with the second port in communication with an interior of the enclosure; and
   sealant within the module housing;
   wherein the module housing includes a main housing body defining the first end portion of the module housing, the main housing body being re-enterable; and
   wherein the main housing body is defined by first and second shell pieces that mate together to enclose an interior of the main housing body, and that are separable to provide access into the interior of the main housing body.

2. The sealing module of claim 1, wherein the first end portion defines a plurality of first ports.

3. The sealing module of claim 1, wherein the module housing includes a stem that projects from the main housing body, wherein the stem defines the second end portion.

4. The sealing module of claim 1, wherein the first and second shell pieces are half-shell pieces.

5. The sealing module of claim 1, wherein the first and second axes are angled at an angle of at least 75 degrees relative to one another.

6. The sealing module of claim 1, wherein the first and second axes are angled at an angle in the range of 75 to 135 degrees.

7. The sealing module of claim 1, wherein the first and second axes are angled at an angle in the range of 75 to 120 degrees.

8. The sealing module of claim 1, wherein the first and second axes are angled at an angle of about 90 degrees.

9. The sealing module of claim 1, wherein the first end portion is configured for anchoring a duct or cable routed to the at least one first port.

10. The sealing module of claim 9, wherein the first end portion includes a slot or slots for receiving a flange or a portion of a convolution of the duct.

11. The sealing module of claim 1, wherein the sealing module is used with a system including a duct for containing at least one optical fiber or at least one fiber optic cable, wherein the duct anchors to the first end portion of the module housing, and wherein the at least one optical fiber or fiber optic cable is adapted to be routed from the duct, through the sealing module to the interior of the enclosure.

12. The sealing module of claim 11, wherein the first end portion includes a first mechanical anchoring interface that interlocks with a second mechanical anchoring interface of the duct to anchor the duct relative to the first end portion of the module housing.

13. The sealing module of claim 12, wherein the second mechanical anchoring interface includes a flange or wherein the duct is convoluted with a convoluted exterior that provides the second mechanical anchoring interface.

14. The sealing module of claim 1, wherein the module housing includes a first stabilization mechanical interface that engages a second stabilization mechanical interface of the enclosure to limit relative movement between the module housing and the enclosure.

15. The sealing module of claim 14, wherein one of the first and second stabilization mechanical interfaces includes a projection and the other of the first and second stabilization mechanical interfaces includes a receptacle.

16. The sealing module of claim 14, wherein the second stabilization mechanical interface is incorporated as part of a bracket that attaches to the enclosure.

17. The sealing module of claim 1, wherein the sealant includes a gel.

18. A sealing module for sealing about a cable and/or duct routed to an enclosure, the enclosure having a sealed entrance location for receiving cables and/or ducts, the sealing module comprising:
   a module housing including a first end portion and a second end portion, the first end portion defining at least one first port and the second end portion defining a second port in communication with the at least one first port, the at least one first port defining a first axis and the second port defining a second axis, the first and second axes being angled relative to each other, the second end portion being configured to be sealed within the sealed entrance location with the second port in communication with an interior of the enclosure; and
   sealant within the module housing;
   wherein the first end portion is configured for anchoring a duct or cable routed to the at least one first port; and wherein the first end portion includes a slot or slots for receiving a flange or a portion of a convolution of the duct.

19. A sealing module for sealing about a cable and/or duct routed to an enclosure, the enclosure having a sealed entrance location for receiving cables and ducts, the sealing module comprising:
- a module housing including a first end portion and a second end portion, the first end portion defining at least one first port and the second end portion defining a second port in communication with the at least one first port, the at least one first port defining a first axis and the second port defining a second axis, the first and second axes being angled relative to each other, the second end portion being configured to be sealed within the sealed entrance location with the second port in communication with an interior of the enclosure; and
- sealant within the module housing;
- wherein the sealing module is used with a system including a duct for containing at least one optical fiber or at least one fiber optic cable, wherein the duct anchors to the first end portion of the module housing, and wherein the at least one optical fiber or fiber optic cable is adapted to be routed from the duct, through the sealing module, to the interior of the enclosure.

20. The sealing module of claim 19, wherein the first end portion includes a first mechanical anchoring interface that interlocks with a second mechanical anchoring interface of the duct to anchor the duct relative to the first end portion of the module housing.

21. The sealing module of claim 20, wherein the second mechanical anchoring interface includes a flange, or wherein the duct is convoluted with a convoluted exterior that provides the second mechanical anchoring interface.

22. A sealing module for sealing about a cable and/or duct routed to an enclosure, the enclosure having a sealed entrance location for receiving cables and/or ducts, the sealing module comprising:
- a module housing including a first end portion and a second end portion, the first end portion defining at least one first port and the second end portion defining a second port in communication with the at least one first port, the at least one first port defining a first axis and the second port defining a second axis, the first and second axes being angled relative to each other, the second end portion being configured to be sealed within the sealed entrance location with the second port in communication with an interior of the enclosure; and
- sealant within the module housing;
- wherein the module housing includes a first stabilization mechanical interface that engages a second stabilization mechanical interface of the enclosure to limit relative movement between the module housing and the enclosure; and
- wherein the second stabilization mechanical interface is incorporated as part of a bracket that attaches to the enclosure.

23. The sealing module of claim 22, wherein one of the first and second stabilization mechanical interfaces includes a projection and the other of the first and second stabilization mechanical interfaces includes a receptacle.

\* \* \* \* \*